US012571345B2

(12) United States Patent
Sibbach et al.

(10) Patent No.:  US 12,571,345 B2
(45) Date of Patent:  Mar. 10, 2026

(54) TURBINE ENGINE INCLUDING A STEAM SYSTEM

(71) Applicant: General Electric Company, Schenectady, NY (US)

(72) Inventors: Arthur W. Sibbach, Boxford, MA (US); Rudolf Selmeier, Fahrenzhausen (DE); Lajith Vijayan, Bengaluru (IN); Rakshit Tirumala, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/366,249

(22) Filed: Aug. 7, 2023

(65) Prior Publication Data

US 2025/0052189 A1      Feb. 13, 2025

(51) Int. Cl.
F02C 3/30          (2006.01)
F02K 3/06          (2006.01)

(52) U.S. Cl.
CPC ................... F02C 3/30 (2013.01); F02K 3/06 (2013.01); *F05D 2220/72* (2013.01); *F05D 2260/606* (2013.01)

(58) Field of Classification Search
CPC .......... F02C 3/30; F02K 3/06; F05D 2220/72; F05D 2260/606
See application file for complete search history.

(56) References Cited

U.S. PATENT DOCUMENTS 4,592,204  A  *   6/1986   Rice ......................... F02C 7/16
                                                              60/39.17
5,896,740  A       4/1999   Shouman
8,151,549  B2      4/2012   Sasaki et al.
            (Continued)

FOREIGN PATENT DOCUMENTS

FR            3127269  A1     3/2023
FR            3130896  A1     6/2023
            (Continued)

OTHER PUBLICATIONS

Jane's Aero-Engines, Issue Seven, Edited by Bill Gunston, Jane's Information Group Inc., Alexandria, Virginia, 2000, pp. 1-67. (Year: 2000).*

(Continued)

*Primary Examiner* — Lorne E Meade
(74) *Attorney, Agent, or Firm* — Venable LLP; Peter T. Hrubiec; Michele V. Frank

(57)          ABSTRACT

A turbine engine for an aircraft includes a fan that rotates to generate a volume of air, a core turbine engine, a nacelle, and a steam system. The core turbine engine includes a combustor that generates combustion gases, and a turbine including a shaft. The combustor and the turbine define a core air flowpath. The fan is drivingly coupled to the shaft. The nacelle circumferentially surrounds the fan and defines a bypass airflow passage between the nacelle and the core turbine engine. The volume of air flows into the bypass airflow passage as bypass air and flows into the core air flowpath as core air. The steam system extracts water from the combustion gases, vaporizes the water to generate steam, and injects the steam into the core air flowpath to add mass flow to the core air. A bypass ratio of the turbine engine is greater than 18:1.

20 Claims, 4 Drawing Sheets

(56) References Cited

U.S. PATENT DOCUMENTS

| | | | |
|---|---|---|---|
| 8,631,656 B2 | 1/2014 | Danis et al. | |
| 8,826,671 B2 | 9/2014 | Kim et al. | |
| 8,950,191 B2 | 2/2015 | Landis et al. | |
| 9,109,514 B2 | 8/2015 | Cheong | |
| 9,464,573 B2 | 10/2016 | Remy et al. | |
| 11,603,798 B1 | 3/2023 | Terwilliger et al. | |
| 2014/0363276 A1 | 12/2014 | Vetters et al. | |
| 2018/0230912 A1* | 8/2018 | Hasel | F02C 7/36 |
| 2021/0207500 A1* | 7/2021 | Klingels | F02C 3/305 |

FOREIGN PATENT DOCUMENTS

| | | | |
|---|---|---|---|
| FR | 3130897 A1 | 6/2023 | |
| FR | 3133367 A1 | 9/2023 | |
| FR | 3133368 A1 | 9/2023 | |

OTHER PUBLICATIONS

Pratt & Whitney PW1000G webpage accessed at https://en.wikipedia.org/wiki/Pratt_%26_Whitney_PW1000G on Aug. 13, 2024, pp. 1-16. (Year: 2024).*

"Steam Turbine Calculator" [accessed on Dec. 3, 2024 at https://invenoeng.com/wp-content/uploads/2017/07/2018-PRV-and-Steam-Turbine-Calculator-Rev-3.xlsm]. (Year: 2017).*

Hall, C.A., and Crichton, D., "Engine Design Studies for a Silent Aircraft", Journal of Turbomachinery, vol. 129, Jul. 2007, pp. 479-487 (paper presented at ASME Turbo Expo 2006: Power for Land, Sea, and Air, GT2006-90559, Barcelona, Spain, May 8-11, 2006, pp. 1653-1662). (Year: 2007).*

Wemming, H., "Validation and Integration of a Rubber Engine Model into an MDO Environment", Linkoping University, Sweden, 2010, pp. 1-90. (Year: 2010).*

Turbofan—Wikipedia webpage [https://en.wikipedia.org/wiki/Turbofan accessed on May 7, 2025] (Year: 2025).*

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

TURBINE ENGINE INCLUDING A STEAM SYSTEM

TECHNICAL FIELD

The present disclosure relates generally to turbine engines including a steam system.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Figure 3:
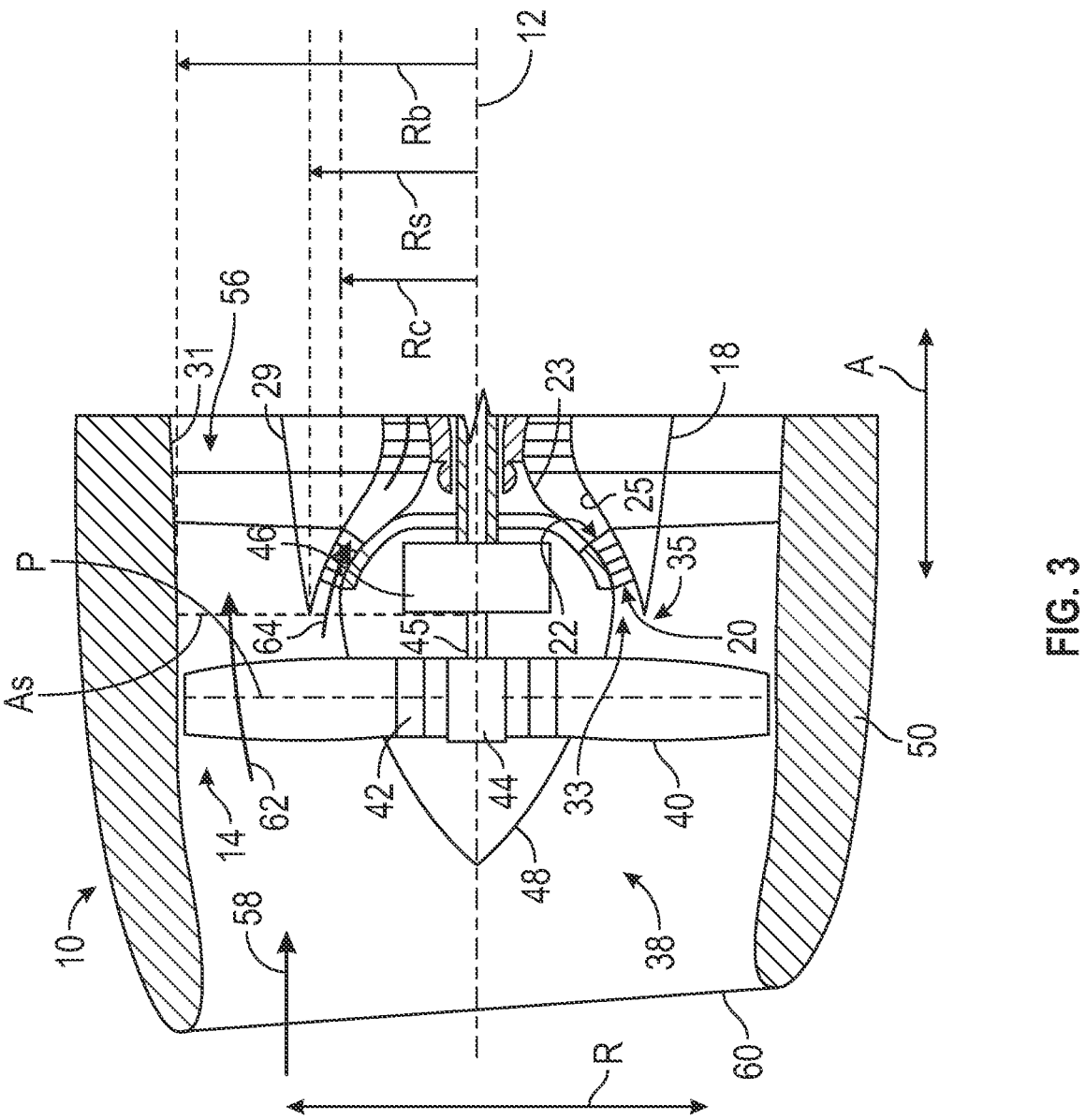
FIG. 3 is a schematic cross-sectional diagram of a forward end of the turbine engine of FIG. 1, taken at detail 3 in FIG. 1, according to the present disclosure.

As used herein, a "bypass ratio" of a turbine engine is a ratio of a bypass area of a bypass airflow passage of the turbine engine to a core inlet area of a core turbine engine of the turbine engine. The "bypass ratio" is measured at a leading edge of a splitter 35 that splits the core inlet 20 and the bypass airflow passage 56, as depicted in FIG. 3. The bypass ratio can also be defined as a ratio of bypass air entering the bypass airflow passage to core air entering the core turbine engine.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. Such turbine engines, such as those used to power aircraft, include a nacelle about the fan and the core section such that the turbine engine is a ducted fan turbine engine. Ducted fan turbine engines include a bypass airflow passage between the core engine and the nacelle. Air that passes through the fan is split into bypass air through the bypass airflow passage and into core air through the core section. A ratio of a bypass area of the bypass airflow passage to a core inlet area of the core engine is referred to as a bypass ratio. The bypass ratio can also be defined by a ratio of the bypass air to the core air. The greater the bypass ratio, the greater the overall efficiency of the turbine engine (e.g., less fuel needed to produce more thrust). The bypass ratio of ducted fan turbine engines is limited due to the nacelle. For example, a size of the bypass airflow passage is dependent on a size of the nacelle. Further, the core engine is difficult to reduce in size while achieving the same thrust level and amount of work done by the core engine due to the compressors not being able to achieve the same amount of compression of the core air if the size of the compressors is reduced. Thus, the bypass ratio of ducted fan turbine engines is typically less than about 12:1.

Further, current turbine engines typically include a two stage high-pressure turbine (HPT) that drives a high-pressure compressor (HPC) having a compression ratio up to 27:1. An HPC that is driven by a single stage HPT can only achieve a compression ratio of up to 12:1. Increasing the compression ratio typically involves increasing the number of compressor stages in the compressor. Balancing the air flow and the compression characteristics of all of the compressor stages of the compressor, with the compressor stages rotating at a common speed, becomes increasingly difficult as the compression ratio and number of stages increases. For example, the number of compressor stages needs to be increased or the compressor may need variable stator vanes or multiple bleed ports at different compressor stages to balance all the compressor stages at multiple operating conditions (e.g., from sub-idle to maximum power).

Accordingly, the turbine engine discussed herein includes a steam system that is used to recover some of the energy from the waste heat by generating steam and driving a steam turbine. The steam is injected into the core engine (e.g., into, upstream of, or downstream of, the combustor). The steam turbine inputs additional work into the core engine and the steam that is injected into the core engine increases a mass flow through the core engine. In this way, less air is needed through the core engine and a size of the core engine is decreased as compared to turbine engines without the benefit of the present disclosure. The core engine includes an HPT having only a single stage of HPT stator vanes and HPT rotor blades that drives an HPC having a plurality of stages (e.g., ten to twelve stages) of HPC stator vanes and HPC rotor blades. Decreasing the size of the core engine allows the bypass ratio to increase for a particular fan size as compared to turbine engines without the benefit of the present disclosure. Thus, the present disclosure provides for a bypass ratio that is greater than 18:1, preferably, in a range of 18:1 to 100:1, more preferably, in a range of 25:1 to 85:1, and, most preferably, in a range of 28:1 to 70:1. The HPC has a compression ratio that is greater than 20:1, preferably, in a range of 20:1 to 40:1, more preferably, greater than 22:1, and, most preferably, greater than 24:1.

The injection of steam into the core turbine engine increases the mass flow through the turbine section, enabling the only single stage HPT to drive the HPC with a compression ratio greater than 20:1. The steam injection into the core turbine engine, in combination with the compression ratio being greater than 20:1, enables the increased bypass ratio and thermal efficiency of the turbine engine, as well as a more efficient thermal cycle of the turbine engine, as compared to turbine engines without the benefit of the present disclosure. Accordingly, the steam system enables the size of the core turbine engine to be reduced, while maintaining a constant fan size, thereby increasing the bypass ratio, as compared to ducted fan turbine engines without the benefit of the present disclosure.

Figure 1:
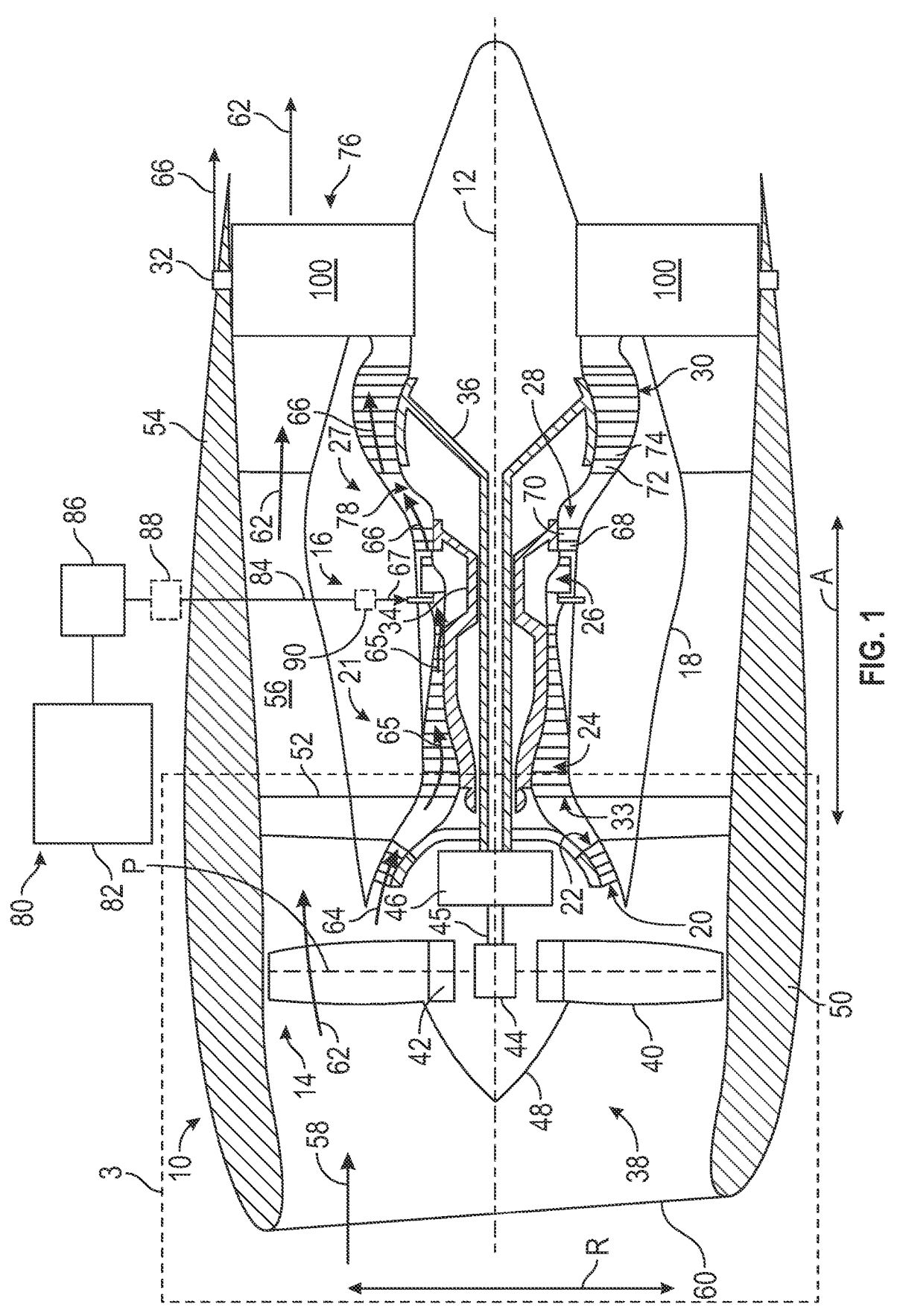
FIG. 1 is a schematic cross-sectional diagram of a turbine engine including a steam system, taken along a longitudinal centerline axis of the turbine engine, according to the present disclosure.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines a core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. A low-pressure (LP) shaft 36 drivingly connects the LPT 30 to the LPC 22 to rotate the LPT 30 and the LPC 22 in unison. The compressor section 21, the combustor 26, the turbine section 27, and the one or more core exhaust nozzles 32 together define a core air flowpath 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and at least a portion of the core turbine engine 16. In this way, the turbine engine 10 is a ducted turbine engine. The nacelle 50 is supported relative to the core turbine engine 16 by a plurality of outlet guide vanes 52 that are spaced circumferentially between the nacelle 50 and the core turbine engine 16. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flowpath 33, or, more specifically, into the core inlet 20 of the LPC 22. The ratio between the bypass air 62 and the core air 64 is known as a bypass ratio. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio that is greater than 20:1, and is preferably in a range of 20:1 to 40:1, as detailed further below.

The combustion gases 66 are routed into the HPT 28 and expanded through the HPT 28 where a portion of thermal energy and kinetic energy from the combustion gases 66 is extracted via only one stage of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and the kinetic energy is extracted from the combustion gases 66 via sequential stages of LPT stator vanes 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. The HPC 24 having a compression ratio in a range of 20:1 to 40:1 enables the HPT 28 to have a pressure expansion ratio in a range of 1.5:1 to 4:1 and the LPT 30 to have a pressure expansion ratio in a range of 4.5:1 to 28:1.

The combustion gases 66 are subsequently routed through the one or more core exhaust nozzles 32 of the core turbine engine 16 to provide propulsive thrust. Simultaneously with the flow of the core air 64 through the core air flowpath 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the core turbine engine 16.

As noted above, the compressed air 65 (the core air 64) is mixed with the fuel 67 in the combustor 26 to form a fuel and air mixture, and combusted, generating combustion gases 66 (combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used, the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a fuel pump 86 to induce the flow of the fuel 67 through the fuel delivery assembly 84 to the combustor 26. In this way, the fuel pump 86 pumps the fuel 67 from the fuel tank 82, through the fuel delivery assembly 84, and into the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the fuel pump 86. The one or more vaporizers 88 are in thermal communication with at least one heat source, such as, for example, waste heat from the turbine engine 10 or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the fuel pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines or turboprop engines.

Figure 2:
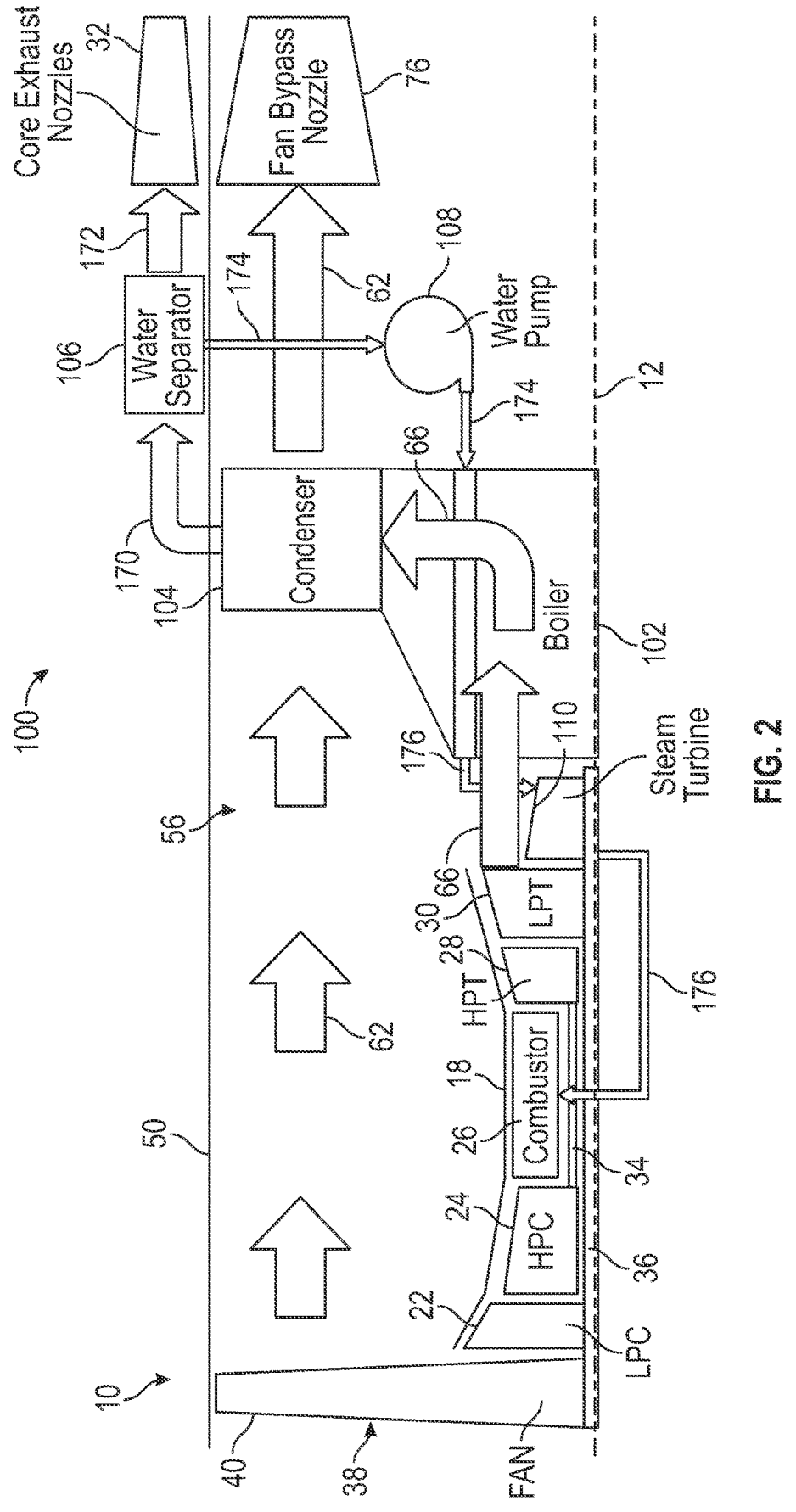
FIG. 2 is a schematic diagram of the turbine engine and the steam system of FIG. 1, according to the present disclosure.

FIG. 2 is a schematic diagram of the turbine engine 10 and the steam system 100 of FIG. 1, according to the present disclosure. For clarity, the turbine engine 10 is shown schematically in FIG. 2 and some components are not shown in FIG. 2. The steam system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and is positioned within the bypass airflow passage 56. The condenser 104 can include any type of condenser for condensing water (e.g., in liquid form) from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the core turbine engine 16. The water separator 106 may be driven to rotate by one of the engine shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water through the boiler 102 where it is converted back to steam. This steam is sent through the steam turbine 110 then injected into the core air flowpath 33 (e.g., into the combustor 26, upstream of the combustor 26, or downstream of the combustor 26).

In operation, the combustion gases 66, also referred to as exhaust, flow from the LPT 30 into the boiler 102. The combustion gases 66 transfer heat into water 174 (e.g., in liquid form) within the boiler 102, as detailed further below. The combustion gases 66 then flow into the condenser 104. The condenser 104 condenses the water 174 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 174 from the combustion gases 66 to generate an exhaust-water mixture 170. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 170 flows into the water separator 106. The water separator 106 separates the water 174 from the exhaust of the exhaust-water mixture 170 to generate separate exhaust 172 and water 174. The exhaust 172 is exhausted out of the turbine engine 10 through the one or more core exhaust nozzles 32 to generate thrust, as detailed above. The boiler 102, the condenser 104, and the water separator 106 thus also define a portion of the hot gas path 78 (FIG. 1) for routing the combustion gases 66, the exhaust-water mixture 170, and the exhaust 172 through the steam system 100 of the turbine engine 10.

The water pump 108 pumps the water 174 (e.g., in liquid form) through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176 (e.g., vapor). The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine blades of the steam turbine 110 to rotate, thereby generating additional work in an output shaft connected to the turbine blades of the steam turbine 110. The steam system 100 may recover up to 70% of the water 174 from the combustion gases 66 and converts the water 174 into steam 176.

As noted above, the core turbine engine 16 includes shafts coupling various rotating components of the core turbine engine 16 and other thrust producing components such as the fan 38. In the core turbine engine 16 shown in FIG. 1, these shafts include the HP shaft 34 and the LP shaft 36. The steam turbine 110 is coupled to one of the shafts of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical shaft work in the LP shaft 36. The reduced temperature steam 176 exiting the turbine 110 is then injected into the core air flowpath 33 (FIG. 1), such as into the combustor 26, upstream of the combustor 26, or downstream of the combustor 26. In this way, the steam system 100 extracts additional work from the heat in exhaust gas that would otherwise be wasted. The steam 176 injected into the core air flowpath 33 (FIG. 1) is in a range of 20% to 50% of the mass flow through the core air flowpath 33 (FIG. 1).

The steam turbine 110 has a pressure expansion ratio in a range of 2:1 to 6:1. The pressure expansion ratio is a ratio of the pressure at an inlet of the steam turbine 110 to the pressure at an exit of the steam turbine 110. The steam turbine 110 contributes approximately 25% of the power to the LP shaft 36 (or to the HP shaft 34) when the steam system 100 recovers approximately 70% of the water 174 and converts the water 174 into the steam 176. The steam turbine 110 has a pressure expansion ratio in a range of 2:1 to 6:1, the LPT 30 has a pressure expansion ratio in a range of 4.5:1 to 28:1, and the steam 176 contributes to 20% to 50% of the mass flow through the core air flowpath 33 (FIG. 1). The steam turbine 110 expands the steam 176, thereby reducing the energy of the steam 176 and reducing the temperature of the steam 176 to approximately a temperature of the compressed air 65 (FIG. 1) discharged from the HPC 24. Such a configuration enables the steam 176 to reduce hot spots in the combustor 26 from the combustion of the fuel (e.g., in particular when the fuel is supercritical hydrogen or gaseous hydrogen).

FIG. 3 is a schematic cross-sectional diagram of a forward end of the turbine engine 10, taken at detail 3 in FIG. 1, according to the present disclosure. As shown in FIG. 3, the core air flowpath 33 is defined between a core inner wall 23 and a core outer wall 25. The core inner wall 23 is radially inward of the core outer wall 25. The bypass airflow passage 56 is defined between a bypass inner wall 29 and a bypass outer wall 31. The bypass inner wall 29 is radially inward of the bypass outer wall 31.

The outer casing 18 includes a splitter 35 positioned at a forward end of the outer casing 18. The splitter 35 splits the volume of air 58 into the bypass air 62 and the core air 64. In this way, the bypass air 62 flows into the bypass airflow passage 56 and the core air 64 flows into the core air flowpath 33, as detailed above. The splitter 35 defines the core outer wall 25 and the bypass inner wall 29 at the core inlet 20.

The core air flowpath 33 defines a core inlet radius $R_c$, the splitter 35 defines a splitter radius $R_s$, and the bypass airflow passage 56 defines a bypass radius $R_b$. The core inlet radius $R_c$, the splitter radius $R_s$, and the bypass radius $R_b$ are all measured at a splitter axial plane $A_s$, which extends normal to the axial direction A. The plane $A_s$ is located at the forward-most or leading edge axial location of the splitter 35. The core inlet radius $R_c$ extends from the longitudinal centerline axis 12 to the core inner wall 23. The splitter radius $R_s$ extends from the longitudinal centerline axis 12 to the core outer wall 25. The bypass radius $R_b$ extends from the longitudinal centerline axis 12 to the bypass outer wall 31. The bypass radius $R_b$ is approximately equivalent to the swept radius of the fan 38.

As mentioned earlier, the ratio between the bypass air 62 and the core air 64 is known as the bypass ratio. For purposes of this disclosure, the bypass ratio is defined as the ratio between an annular bypass area and an annular core inlet area, and is defined at the splitter axial plane $A_s$. The bypass area is an area of the bypass airflow passage 56 and is equal to $\pi*(R_b^2-R_s^2)$. The core intake area is an area of the core air flowpath 33 at the splitter axial plane $A_s$ and is equal to $\pi*(R_s^2-R_c^2)$. The steam system 100 (FIG. 1) may enable the turbine engine 10 to have a bypass ratio greater than 18:1, as detailed further below.

Figure 4:
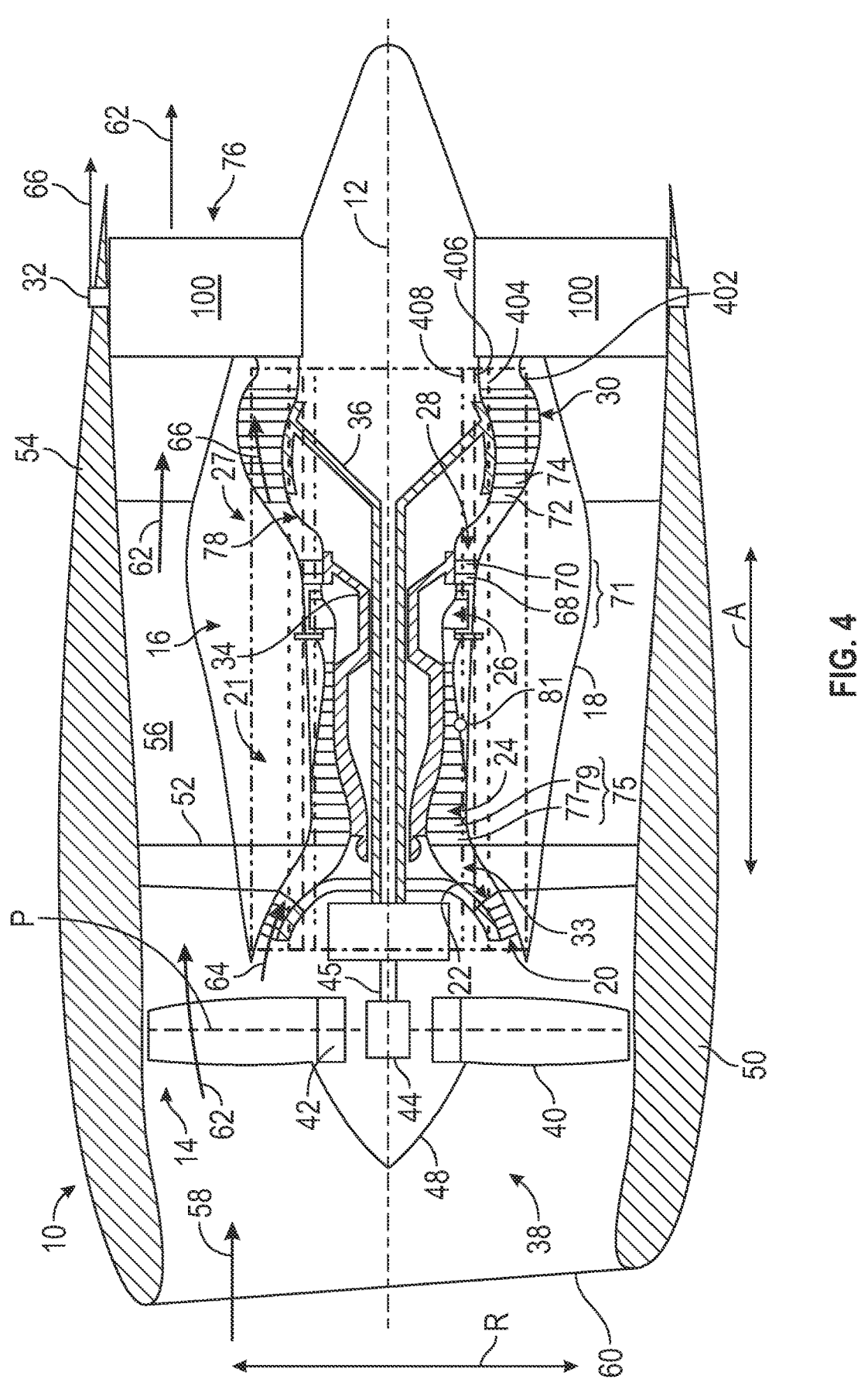
FIG. 4 is a schematic cross-sectional diagram of the turbine engine of FIG. 1 showing various core sizes of the core turbine engine, taken along the longitudinal centerline axis of the turbine engine, according to the present disclosure.

FIG. 4 is a schematic cross-sectional diagram of the turbine engine 10 showing radial dimensions of the core turbine engine 16, taken along the longitudinal centerline axis 12 of the turbine engine 10, according to the present disclosure. As detailed above with respect to FIG. 2, the steam system 100 injects the steam 176 (FIG. 2) into the core air flowpath 33 (e.g., into, upstream of, or downstream of, the combustor 26). The injection of the steam 176 into the core air flowpath 33 increases a mass flow through the turbine section 27. In this way, the steam 176 adds mass flow to the combustion gases 66 (e.g., the air) through the turbine section 27. Thus, the HPT 28 is able to drive the HPC 24 having higher compression ratios as compared to turbine engines not utilizing the combined cycle waste heat recovery of the present disclosure. The HPT 28 may have only one stage 71 capable of sustainably driving a higher number of stages 75 of the HPC (e.g., 10, 11 or 12 stages of the HPC) due to the higher mass flow (resulting from the steam injection) exiting the combustor 26. In some embodiments, the steam 176 injection enables a single stage HPT to sustainably drive the HPC 24 having a compression ratio greater than 20:1 and less than 40:1. The HPC 24 may have ten to twelve stages 75. In some embodiments, the HPC 24 includes eleven stages 75. In some embodiments, the HPC 24 includes twelve stages 75. The steam 176 that is injected into the core air flowpath 33 (e.g., into, upstream of, or downstream of, the combustor 26) enables the only one stage 71 of the HPT 28 to drive the plurality of stages 75 of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

The steam 176 also enables the HPC 24 to have a greater compression ratio as compared to HPCs without the benefit of the present disclosure. The compression ratio is a ratio of a pressure at a last stage 75 of the HPC 24 to a pressure at a first stage 75 of the HPC 24. The compression ratio of the HPC 24 is greater than 20:1. In some embodiments, the compression ratio of the HPC 24 is in a range of 20:1 to 40:1. In some embodiments, the compression ratio of the HPC 24 is greater than 22:1 or greater than 24:1. In this way, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the core turbine engine 16 provided by the steam injection. A reduced size (outer diameter) and weight of the HPC 24 is provided, as compared to turbine engines without the benefit of the present disclosure.

In some embodiments, the HPC stator vanes 77 of at least two stages 75 of the HPC 24 are variable stator vanes that are controlled to be pitched about a pitch axis to vary a pitch of the HPC stator vanes 77. In some embodiments, the HPC 24 includes one or more compressor bleed valves 81 that are controlled to be opened to bleed a portion of the compressed air 65 from the HPC 24. The one or more compressor bleed valves 81 are preferably positioned between a fourth stage 75 of the HPC 24 and a last stage 75 of the HPC 24. The HPC stator vanes 77 that are variable stator vanes and the one or more compressor bleed valves 81 help to balance the air flow (e.g., the compressed air 65) through all stages 75 of the HPC 24. Such a balance, in combination with the steam 174 injected into the core air flowpath 33 to flow through the core air flowpath 33, enables the number of stages 75 of the HPC 24 to include ten to twelve stages 75 for compression ratios greater than 20:1.

The additional mass flow provided by the steam 176, which adds additional work input to the LP shaft 36 through the steam turbine 110, and/or reduced-size HPT enables a reduced core size of the core turbine engine 16, which increases the bypass ratio of the turbine engine 10, as compared to core turbine engines without the benefit of the present disclosure. "Core size" is in reference to a diameter or radial extent of the core turbine engine 16. FIG. 4 shows in dotted lines and/or dashed lines various radial extents along the length of the core, including a first core size 402, a second core size 404, a third core size 406, and a fourth core size 408. The first core size 402 represents a core size of the turbine engine 10 without the steam 176 injected into the core air flowpath 33, the second core size 404 represents a core size of the turbine engine 10 with a first amount of the steam 176 injected into the core air flowpath 33, the third core size 406 represents a core size of the turbine engine 10 with a second amount of the steam 176 injected into the core air flowpath 33, and the fourth core size 408 represents a core size of the turbine engine 10 with a third amount of the steam 176 injected into the core air flowpath 33. The third amount of the steam 176 is greater than the second amount of the steam 176. The second amount of the steam 176 is greater than the first amount of the steam 176. The first core size 402 is greater than the second core size 404, the second core size 404 is greater than the third core size 406, and the third core size 406 is greater than the fourth core size 408.

As more of the steam 176 is expanded through the steam turbine 110 (FIG. 1) and injected directly into the core air flowpath 33 (e.g., into, upstream of, or downstream of, the combustor 26), the core size of the core turbine engine 16 can be decreased from the first core size 402 to the fourth core size 408. For a particular diameter of the fan 38, the bypass ratio of the turbine engine 10 increases as the core size decreases from the first core size 402 to the fourth core size 408. For example, as the core size decreases from the first core size 402 to the fourth core size 408, the splitter radius $R_s$ (FIG. 3) and the core inlet radius $R_c$ (FIG. 3) decrease, while the bypass radius $R_b$ (FIG. 3) remains the same (e.g., the diameter of the fan 38 remains the same), thereby increasing the bypass ratio for a particular size of the fan 38. In an exemplary embodiment, the first core size 402 corresponds to a bypass ratio of about 7:1, the second core size 404 corresponds to a bypass ratio of about 15:1, the third core size 406 corresponds to a bypass ratio of 20:1, and the fourth core size 408 corresponds to a bypass ratio of about 30:1. In some embodiments the bypass ratio of the turbine engine 10 is in a range of 18:1 and less than 30:1. In some embodiments, the bypass ratio is in a range of 18:1 to 100:1, in a range of 25:1 to 85:1, or in a range of 28:1 to 70:1. In this way, the steam system 100 can enable an increased bypass ratio in which the turbine engine 10 can move a larger mass of air through the bypass, reducing the pressure ratio of the fan 38 and increasing the efficiency of the turbine engine 10 as compared to turbine engines without the benefit of the present disclosure.

Table 1 provides exemplary values of the bypass radius $R_b$, the splitter radius $R_s$, the core inlet radius $R_c$, and the bypass ratio. The values provided in Table 1 are exemplary only, and the values of the bypass radius $R_b$, the splitter radius $R_s$, the core inlet radius $R_c$, and the bypass ratio can vary from the values (e.g., higher or lower than the values) provided based on particular engine sizes.

TABLE 1

| Bypass Radius $R_b$ (in.) | Splitter Radius $R_s$ (in.) | Core Inlet Radius $R_c$ (in.) | Bypass Ratio |
|---|---|---|---|
| 40.50 | 18.19 | 14.89 | 12:1 |
| 23.00 | 10.33 | 8.46 | 12:1 |
| 45.00 | 20.21 | 16.54 | 12:1 |
| 35.00 | 15.72 | 12.87 | 12:1 |
| 40.50 | 16.61 | 13.60 | 15:1 |
| 40.50 | 14.70 | 12.03 | 20:1 |
| 40.50 | 13.32 | 10.90 | 25:1 |
| 40.50 | 12.66 | 10.36 | 28:1 |
| 45.00 | 14.07 | 11.51 | 28:1 |
| 35.00 | 10.94 | 8.95 | 30:1 |
| 40.50 | 12.27 | 10.05 | 30:1 |
| 40.50 | 11.44 | 9.36 | 35:1 |
| 45.00 | 12.71 | 10.40 | 35:1 |
| 35.00 | 9.89 | 8.09 | 35:1 |

As shown in Table 1, the splitter radius $R_s$ and the core inlet radius $R_c$ decrease for a particular bypass radius $R_b$ as the steam system 100 injects more of the steam 176 into the core air flowpath 33. As the splitter radius $R_s$ and the core inlet radius $R_c$ decrease, the bypass ratio increases for a particular size of the fan 38 (e.g., for a particular bypass radius $R_b$).

The invention may be practiced for engines having take-off thrust ratings of between thirty thousand to forty thousand pounds (30,000 lbs. to 40,000 lbs.), eight thousand pounds to fifteen thousand pounds (8,000 lbs. to 15,000 lbs.), and fifteen thousand pounds to thirty thousand pounds (15,000 lbs. to 30,000 lbs.).

The take-off thrust rating of the turbine engine 10 effects the overall size of the turbine engine 10 and the dimensions of the bypass radius $R_b$, the splitter radius $R_s$, and the core inlet radius $R_c$. For engines rated for thirty thousand pounds to forty thousand pounds (30,000 lbs. to 40,000 lbs.), the bypass radius $R_b$ is in a range of thirty-five inches to forty-five inches (35.00 in. to 45.00 in.), the splitter radius $R_s$ is in a range of nine inches to twenty-one inches (9.00 in. to 21.00 in.), and the core inlet radius $R_c$ is in a range of seven point five inches to seventeen inches (7.50 in. to 17.00 in.). For engines rated for eight thousand pounds to fifteen thousand pounds (8,000 lbs. to 15,000 lbs.), the bypass radius $R_b$ is in a range of twenty inches to twenty-five inches (20.00 in. to 25.00 in.), the splitter radius $R_s$ is in a range of five inches to twelve inches (5.00 in. to 12.00 in.), and the core inlet radius $R_c$ is in a range of four inches to nine point five inches (4.00 in. to 9.50 in.). For engines rated for fifteen thousand pounds to thirty thousand pounds (15,000 lbs. to 30,000 lbs.), the bypass radius $R_b$ is in a range of twenty-three inches to thirty-seven inches (23.00 in. to 37.00 in.), the splitter radius $R_s$ is in a range of six inches to seventeen inches (6.00 in. to 17.00 in.), and the core inlet radius $R_c$ is in a range of five inches to fourteen inches (5.00 in. to 14.00 in.). Accordingly, the bypass radius $R_b$ is in a range of twenty inches to forty-five inches (20 in. to 45 in.), the splitter radius $R_s$ is in a range of five inches to twenty-one inches (5 in. to 21 in.), and the core inlet radius $R_c$ is in a range of four inches to seventeen inches (4 in. to 17 in.). The ranges provided herein are exemplary only and the ranges can be scaled up or down based on a particular thrust level for the turbine engine 10.

Accordingly, the steam system 100 enables an increased compression ratio and an increased bypass ratio for ducted (e.g., the nacelle 50) turbine engines 10 as compared to turbine engines without the benefit of the present disclosure. The increased compression ratio and the increased bypass ratio is enabled by the steam turbine 110 inputting additional work in the LP shaft 36 and by the injection of the steam 176 into the core air flowpath 33, which increases the mass flow through the turbine section 27, thereby enabling a reduced size of the core turbine engine 16, as compared to turbine engines without the benefit of the present disclosure. Without an increase in diameter of the fan 38, the steam system increases the bypass ratio by enabling a reduced core size.

Further aspects of the present disclosure are provided by the subject matter of the following clauses.

A turbine engine for an aircraft. The turbine engine comprises a fan including a plurality of fan blades that rotates to generate a volume of air, a core turbine engine comprising a combustor that combusts compressed air and fuel to generate combustion gases, and a turbine including a shaft, the combustor and the turbine defining a core air flowpath, and the fan being drivingly coupled to the shaft such that rotation of the turbine causes the fan to rotate, a nacelle that circumferentially surrounds the fan, the nacelle defining a bypass airflow passage between the nacelle and the core turbine engine, the volume of air from the fan being split and flowing into the bypass airflow passage as bypass air and flowing into the core air flowpath as core air, and a steam system that extracts water from the combustion gases, vaporizes the water to generate steam, and injects the steam into the core air flowpath to add mass flow to the core air, a bypass ratio of the bypass air to the core air being greater than 18:1.

The turbine engine of the preceding clause, the bypass ratio being in a range of 18:1 to 100:1.

The turbine engine of any preceding clause, the bypass ratio being in a range of 25:1 to 85:1.

The turbine engine of any preceding clause, the bypass ratio being in a range of 28:1 to 70:1.

The turbine engine of any preceding clause, the steam system including a steam turbine that receives the steam to rotate the steam turbine, the steam turbine being drivingly coupled to the shaft to rotate the shaft when the steam turbine rotates.

The turbine engine of any preceding clause, the core turbine engine further comprising a compressor that compresses the core air to generate the compressed air, the compressor being drivingly coupled to the shaft and defining a portion of the core air flowpath.

The turbine engine of any preceding clause, the compressor including a high-pressure compressor and includes a compression ratio greater than 20:1.

The turbine engine of any preceding clause, the turbine including a high-pressure turbine (HPT) and includes only one stage of HPT rotor blades and HPT stator vanes.

The turbine engine of any preceding clause, further comprising a splitter positioned at a core inlet of the core air flowpath that splits the volume of air into the core air in the core air flowpath and the bypass air in the bypass airflow passage.

The turbine engine of any preceding clause, the core air flowpath being defined between a core inner wall and a core outer wall, the core outer wall being defined by the splitter, and the bypass airflow passage is defined between a bypass inner wall defined by the splitter and a bypass outer wall defined at the nacelle.

The turbine engine of any preceding clause, the core air flowpath having a core inlet radius defined from a longitudinal centerline axis of the turbine engine to the core inner wall at a leading edge of the splitter, the core inlet radius being in a range of 4 inches to 17 inches, the bypass airflow passage has a bypass radius defined from the longitudinal centerline axis to the bypass outer wall, the bypass radius being in a range of 20 inches to 45 inches, and the splitter has a splitter radius defined from the longitudinal centerline axis to the core outer wall at the leading edge of the splitter, the splitter radius being in a range of 5 inches to 17 inches.

A turbine engine for an aircraft. The turbine engine comprises a fan including a plurality of fan blades that rotates to generate a volume of air, a core turbine engine comprising a compressor that compresses a portion of the volume of air to generate compressed air, the compressor including a plurality of stages and a compression ratio greater than 20:1, a combustor that combusts the compressed air and fuel to generate combustion gases, and a turbine including a shaft and having only one stage of turbine stator vanes and turbine rotor blades, the compressor, the combustor, and the turbine defining a core air flowpath, and the compressor being drivingly coupled to the shaft such that rotation of the turbine causes the compressor to rotate, and a steam system that extracts water from the combustion gases, vaporizes the water to generate steam, and injects the steam into the core air flowpath to add mass flow to the combustion gases.

The turbine engine of the preceding clause, the compression ratio being in a range of 20:1 to 40:1.

The turbine engine of any preceding clause, the compression ratio being greater than 22:1.

The turbine engine of any preceding clause, the compression ratio being greater than 24:1.

The turbine engine of any preceding clause, the plurality of stages of the compressor including ten to twelve stages.

The turbine engine of any preceding clause, the plurality of stages of the compressor including eleven stages.

The turbine engine of any preceding clause, the steam system including a steam turbine that receives the steam to rotate the steam turbine, the steam turbine being drivingly coupled to the shaft to rotate the shaft when the steam turbine rotates.

The turbine engine of any preceding clause, further comprising a nacelle that circumferentially surrounds the fan, the nacelle defining a bypass airflow passage between the nacelle and the core turbine engine, the volume of air from the fan being split and flowing into the bypass airflow passage as bypass air and flowing into the core air flowpath as core air. The turbine engine of any preceding clause, a bypass ratio of the bypass air to the core air being greater than 18:1.

The turbine engine of any preceding clause, the steam system including a condenser that condenses the water from the combustion gases to extract the water from the combustion gases.

The turbine engine of any preceding clause, the steam system including a boiler that vaporizes the water to generate the steam.

The turbine engine of any preceding clause, the boiler positioned downstream of the combustor and receiving the combustion gases.

The turbine engine of any preceding clause, the steam turbine receiving the steam from the boiler.

The turbine engine of any preceding clause, the condenser receiving the combustion gases from the boiler.

The turbine engine of any preceding clause, the condenser being positioned downstream of the boiler and in the bypass airflow passage for the bypass air to cool the combustion gases to condense the water from the combustion gases.

The turbine engine of any preceding clause, further comprising a water separator positioned downstream of the condenser, the water separator separating the water from the combustion gases.

The turbine engine of the preceding clause, the water separator being a cyclonic separator.

The turbine engine of any preceding clause, the boiler being fluidly coupled to the water separator.

The turbine engine of any preceding clause, further comprising a water pump in fluid communication with the water separator and with the boiler to induce the flow of the water from the water separator to the boiler.

The turbine engine of any preceding clause, the shaft being a high-pressure shaft.

The turbine engine of any preceding clause, further comprising a low-pressure turbine having a low-pressure shaft coupled to the fan.

The turbine engine of any preceding clause, further comprising a low-pressure compressor coupled to the low-pressure shaft to be driven by the low-pressure turbine and the steam turbine.

The turbine engine of any preceding clause, the fan comprising a fan shaft coupled to the low-pressure shaft to be driven by the low-pressure shaft.

The turbine engine of any preceding clause, the steam system recovering up to 70% of the water from the combustion gases.

The turbine engine of any preceding clause, the steam being in a range of 20% to 50% of the mass flow through the core air flowpath.

The turbine engine of any preceding clause, the steam turbine having a pressure expansion ratio in a range of 2:1 to 6:1.

The turbine engine of any preceding clause, the steam turbine providing approximately 25% of power to the shaft.

The turbine engine of any preceding clause, each stage of the compressor including a plurality of compressor stator vanes and compressor rotor blades.

The turbine engine of any preceding clause, the compressor stator vanes of at least two stages of the compressor being variable stator vanes.

The turbine engine of any preceding clause, the compressor further comprising one or more compressor bleed valves that open to bleed air from the compressor.

The turbine engine of any preceding clause, the one or more compressor bleed valves being located between a fourth stage of the compressor and a last stage of the compressor.

The turbine engine of any preceding clause, the low-pressure turbine having a pressure expansion ratio in a range of 4.5:1 to 28:1.

The turbine engine of any preceding clause, the high-pressure turbine having a pressure expansion ratio in a range of 1.5:1 to 4:1.

The turbine engine of any preceding clause, the turbine engine having a thrust rating in a range of 30,000 pounds to 40,000 pounds.

The turbine engine of the preceding clause, the bypass radius being in a range of 35.00 inches to 45.00 inches, the splitter radius being in a range of 9.00 inches to 21.00 inches, and the core inlet radius being in a range of 7.50 inches to 17.00 inches.

The turbine engine of any preceding clause, the turbine engine having a thrust rating in a range of 8,000 pounds to 15,000 pounds.

The turbine engine of the preceding clause, the bypass radius being in a range of 20.00 inches to 25.00 inches, the splitter radius being in a range of 5.00 inches to 12.00 inches, and the core inlet radius being in a range of 4.00 inches to 9.50 inches.

The turbine engine of any preceding clause, the turbine engine having a thrust rating in a range of 15,000 pounds to 30,000 pounds.

The turbine engine of the preceding clause, the bypass radius being in a range of 23.00 inches to 37.00 inches, the splitter radius being in a range of 6.00 inches to 17.00 inches, and the core inlet radius being in a range of 5.00 inches to 14.00 inches.

The turbine engine of any preceding clause, the bypass ratio being a function of the ratio between a bypass area and a core inlet area, and being defined at a splitter axial plane $A_s$ at the splitter.

The turbine engine of any preceding clause, the bypass area being equal to $\pi*(R_b{}^2-R_s{}^2)$, $R_b$ being the bypass radius and $R_s$ is the splitter radius.

The turbine engine of any preceding clause, the core inlet area being equal to $\pi*(R_s{}^2-R_c{}^2)$, $R_c$ being the core inlet radius.

The turbine engine of any preceding clause, further comprising an outer casing that circumferentially surrounds the core turbine engine.

The turbine engine of any preceding clause, the splitter positioned at a forward end of the outer casing.

The turbine engine of any preceding clause, the compression ratio being a ratio of a pressure at a last stage of the compressor to a pressure at a first stage of the compressor.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine for an aircraft, the turbine engine comprising:
   a fan including a plurality of fan blades that rotates to generate a volume of air;
   a core turbine engine comprising:
      a combustor that combusts compressed air and fuel to generate combustion gases; and
      a turbine including a shaft, the combustor and the turbine defining a core air flowpath, and the fan being drivingly coupled to the shaft such that rotation of the turbine causes the fan to rotate;
   a nacelle that circumferentially surrounds the fan, the nacelle defining a bypass airflow passage between the nacelle and the core turbine engine, the volume of air from the fan being split and flowing into the bypass airflow passage as bypass air and flowing into the core air flowpath as core air;
   one or more core exhaust nozzles extending radially through a downstream section of the nacelle and in fluid communication with the turbine; and
   a steam system that extracts water from the combustion gases, vaporizes the water to generate steam, and injects the steam into the core air flowpath to add mass flow to the core air, wherein a bypass ratio of the bypass air to the core air is in a range of 18:1 to 100:1,
   wherein the combustion gases flow from the steam system and out of the turbine engine through the one or more core exhaust nozzles.

2. The turbine engine of claim 1, wherein the bypass ratio is in a range of 25:1 to 85:1.

3. The turbine engine of claim 1, wherein the bypass ratio is in a range of 28:1 to 70:1.

4. The turbine engine of claim 1, the core turbine engine further comprising a compressor that compresses the core air to generate compressed core air, the compressor being drivingly coupled to the shaft and defining a portion of the core air flowpath.

5. The turbine engine of claim 4, wherein the compressor includes a high-pressure compressor and includes a compression ratio in a range of 20:1 to 40:1.

6. The turbine engine of claim 5, wherein the turbine includes a high-pressure turbine (HPT) and includes only one stage of HPT rotor blades and HPT stator vanes.

7. The turbine engine of claim 5, wherein the compression ratio is in a range of 22:1 to 40:1.

8. The turbine engine of claim 5, wherein the compression ratio is in a range of 24:1 to 40:1.

9. The turbine engine of claim 1, wherein the core air flowpath is defined between a core inner wall and a core outer wall, the core outer wall being defined by a splitter, and
   the bypass airflow passage is defined between a bypass inner wall defined by the splitter and a bypass outer wall defined at the nacelle.

10. The turbine engine of claim 9, wherein the core air flowpath defines a core inlet radius from a longitudinal centerline axis of the turbine engine to the core inner wall at a leading edge of the splitter, the bypass airflow passage defines a bypass radius from the longitudinal centerline axis to the bypass outer wall, and the splitter defines a splitter radius from the longitudinal centerline axis to the core outer wall at the leading edge of the splitter, wherein the turbine engine has a take-off thrust rating in a range of 8,000 pounds to 15,000 pounds, in a range of 15,000 pounds to 30,000 pounds, or in a range of 30,000 pounds to 40,000 pounds, wherein, for the take-off thrust rating in the range of 8,000 pounds to 15,000 pounds, the bypass radius is in a range of 20.00 inches to 25.00 inches, the splitter radius is in a range of 5.00 inches to 12.00 inches, and the core inlet radius is in a range of 4.00 inches to 9.50 inches, wherein, for the take-off thrust rating in the range of 15,000 pounds to 30,000 pounds, the bypass radius is in a range of 23.00 inches to 37.00 inches, the splitter radius is in a range of 6.00 inches to 17.00 inches, and the core inlet radius is in a range of 5.00 inches to 14.00 inches, and wherein, for the take-off thrust rating in the range of 30,000 pounds to 40,000 pounds, the bypass radius is in a range of 35.00 inches to 45.00 inches, the splitter radius is in a range of 9.00 inches to 21.00 inches, and the core inlet radius is in a range of 7.50 inches to 17.00 inches.

11. The turbine engine of claim 1, wherein the steam system includes a steam turbine that receives the steam to rotate the steam turbine, the steam turbine being drivingly coupled to the shaft to rotate the shaft when the steam turbine rotates, and the steam turbine has an expansion ratio in a range of 2:1 to 6:1.

12. The turbine engine of claim 1, wherein the steam contributes 20% to 50% of a total mass flow through the core air flowpath.

13. The turbine engine of claim 1, wherein the steam system includes a steam turbine that receives the steam to rotate the steam turbine, the steam turbine being drivingly coupled to the shaft to rotate the shaft when the steam turbine rotates, and an inlet of the steam turbine being downstream of an outlet of the steam turbine with respect to a flow of the combustion gases from the turbine such that the steam flows through the steam turbine in a direction opposite of the flow of the combustion gases.

14. A turbine engine for an aircraft, the turbine engine comprising:

a fan including a plurality of fan blades that rotates to generate a volume of air;

a nacelle that circumferentially surrounds the fan;

a core turbine engine comprising:

a compressor that compresses a portion of the volume of air to generate compressed air, the compressor including from ten stages to twelve stages and a compression ratio that is greater than 24:1 and less than or equal to 40:1;

a combustor that combusts the compressed air and fuel to generate combustion gases; and a turbine including a shaft and having only one stage of turbine stator vanes and turbine rotor blades, the compressor, the combustor, and the turbine defining a core air flowpath, and the compressor being drivingly coupled to the shaft such that rotation of the turbine causes the compressor to rotate;

one or more core exhaust nozzles extending radially through a downstream section of the nacelle and in fluid communication with the turbine; and a steam system that extracts water from the combustion gases, vaporizes the water to generate steam, and injects the steam into the core air flowpath to add mass flow to the combustion gases, wherein the combustion gases flow from the steam system and out of the turbine engine through the one or more core exhaust nozzles.

15. The turbine engine of claim 14, wherein the compressor includes eleven stages.

16. The turbine engine of claim 14, wherein the nacelle defines a bypass airflow passage between the nacelle and the core turbine engine, the volume of air from the fan being split and flowing into the bypass airflow passage as bypass air and flowing into the core air flowpath as core air.

17. The turbine engine of claim 16, wherein a bypass ratio of the bypass air to the core air is in a range of 18:1 to 100:1.

18. The turbine engine of claim 17, further comprising a splitter positioned at a core inlet of the core air flowpath that splits the volume of air into the core air in the core air flowpath and the bypass air in the bypass airflow passage, wherein the splitter defines a splitter radius at a leading edge of the splitter, the core air flowpath defines a core inlet radius at the leading edge of the splitter, and the bypass airflow passage defines a bypass radius at the leading edge of the splitter, wherein the turbine engine has a take-off thrust rating in a range of 8,000 pounds to 15,000 pounds, in a range of 15,000 pounds to 30,000 pounds, or in a range of 30,000 pounds to 40,000 pounds, wherein, for the take-off thrust rating in the range of 8,000 pounds to 15,000 pounds, the bypass radius is in a range of 20.00 inches to 25.00 inches, the splitter radius is in a range of 5.00 inches to 12.00 inches, and the core inlet radius is in a range of 4.00 inches to 9.50 inches, wherein, for the take-off thrust rating in the range of 15,000 pounds to 30,000 pounds, the bypass radius is in a range of 23.00 inches to 37.00 inches, the splitter radius is in a range of 6.00 inches to 17.00 inches, and the core inlet radius is in a range of 5.00 inches to 14.00 inches, and wherein, for the take-off thrust rating in the range of 30,000 pounds to 40,000 pounds, the bypass radius is in a range of 35.00 inches to 45.00 inches, the splitter radius is in a range of 9.00 inches to 21.00 inches, and the core inlet radius is in a range of 7.50 inches to 17.00 inches.

19. The turbine engine of claim 14, wherein the steam system includes a steam turbine that receives the steam to rotate the steam turbine, the steam turbine being drivingly coupled to the shaft to rotate the shaft when the steam turbine rotates, and the steam turbine has an expansion ratio in a range of 2:1 to 6:1.

20. The turbine engine of claim 14, wherein the steam contributes 20% to 50% of a total mass flow through the core air flowpath.

* * * * *